United States Patent [19]

Bishop et al.

[11] Patent Number: 4,860,555

[45] Date of Patent: Aug. 29, 1989

[54] VEGETABLE CRISPER

[75] Inventors: Jerry W. Bishop; Keith G. Savas; Wendell G. Wilson, all of Atlanta, Ga.

[73] Assignee: Jerry W. Bishop, Atlanta, Ga.

[21] Appl. No.: 279,112

[22] Filed: Dec. 2, 1988

[51] Int. Cl.⁴ ............................................. F25N 17/02
[52] U.S. Cl. ....................................... 62/376; 62/78; 62/382; 62/441
[58] Field of Search ................... 62/78, 91, 382, 441, 62/376, 373

[56] References Cited

U.S. PATENT DOCUMENTS

| 1,954,749 | 4/1934 | Small | 62/376 |
| 2,344,151 | 3/1944 | Kasser | 62/382 X |
| 2,411,833 | 11/1946 | McMahon | 62/141 |
| 2,470,551 | 5/1949 | Fish | 62/141 |
| 2,560,057 | 7/1951 | Williams | 62/382 X |
| 2,709,900 | 6/1955 | Zearfass, Jr. et al. | 62/382 X |
| 2,812,643 | 11/1957 | Worschitz | 62/104 |
| 3,203,199 | 8/1965 | Stewart | 62/441 X |
| 3,357,201 | 12/1967 | Tayama | 62/382 |
| 3,364,694 | 1/1968 | Cohen et al. | 62/265 |
| 3,600,905 | 8/1971 | Dymek | 62/382 |
| 3,834,178 | 9/1974 | Pink | 62/338 |
| 3,961,925 | 6/1976 | Rhoad | 62/376 |
| 4,013,434 | 3/1977 | Kronenberger et al. | 62/382 |

Primary Examiner—Lloyd L. King
Attorney, Agent, or Firm—Thomas & Kennedy

[57] ABSTRACT

A vegetable crisper has a container adapted to contain a body of water in a lower portion beneath a support (14). The crisper also has a spray head (24) and an electric pump (18) for pumping water from the container lower portion to the spray head through a filter (19).

11 Claims, 2 Drawing Sheets

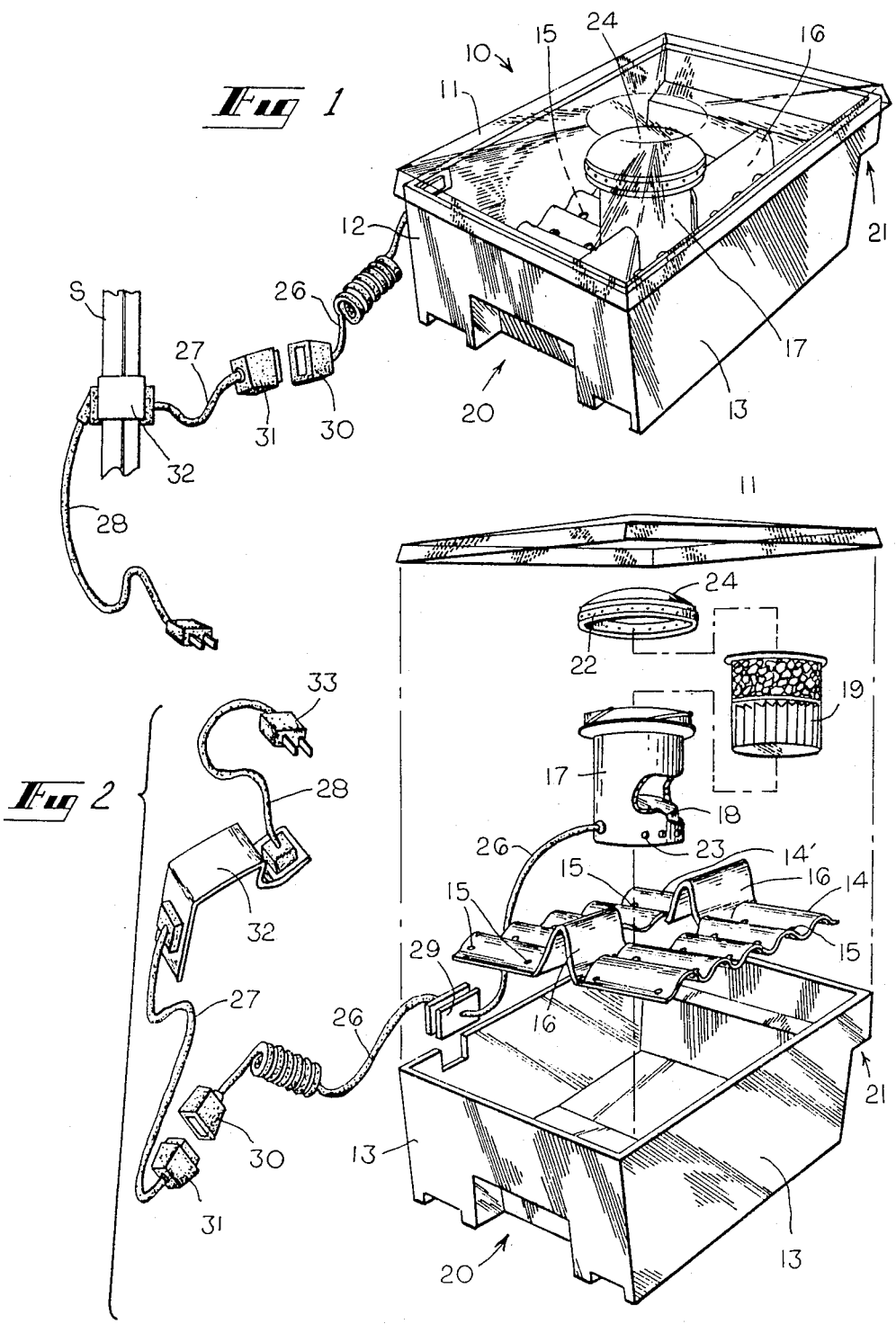

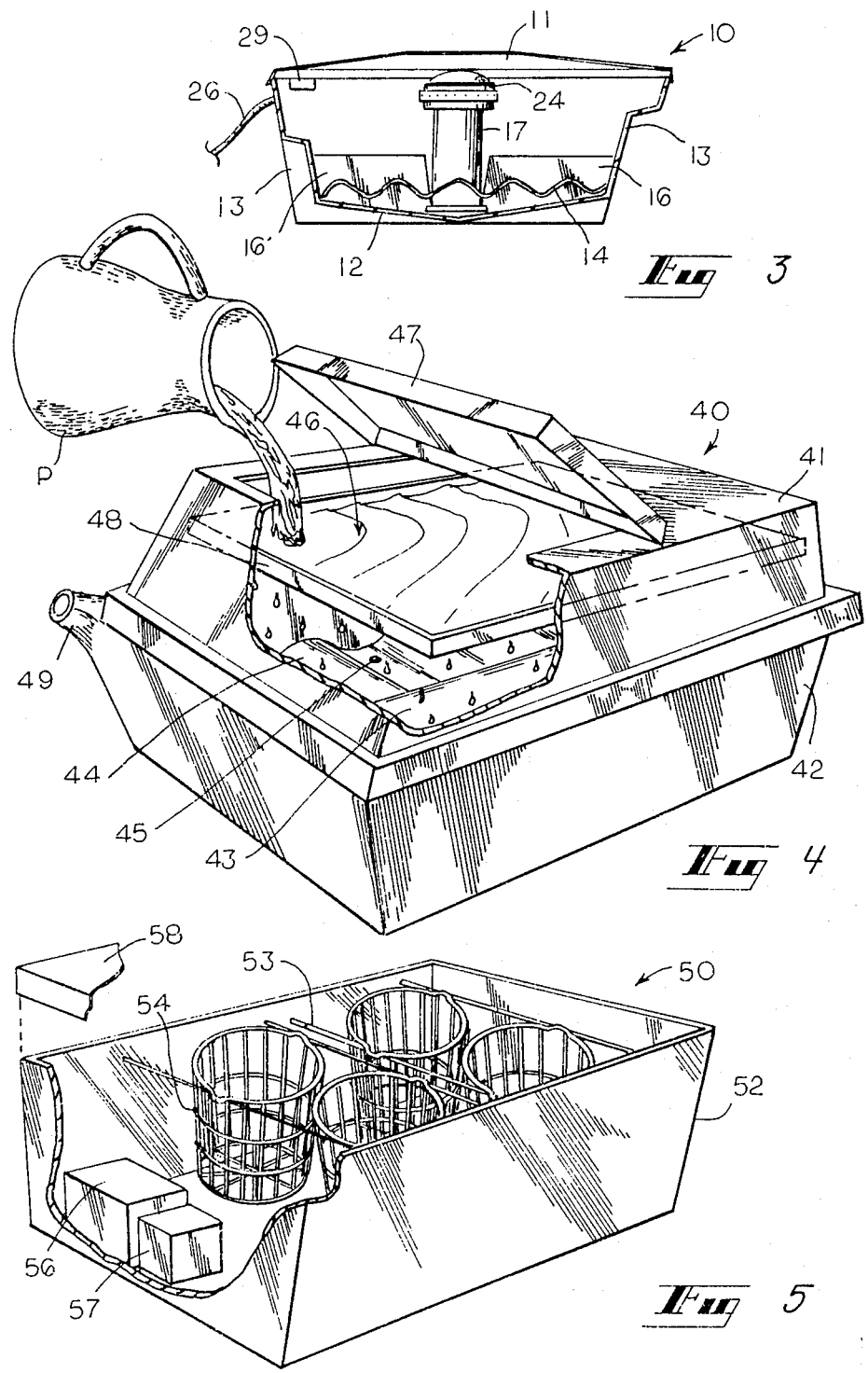

VEGETABLE CRISPER

TECHNICAL FIELD

This invention relates to apparatuses for use in storing of vegetables in a manner to keep them fresh and crisp.

BACKGROUND OF THE INVENTION

Today most people shop for fresh vegetables more on a weekly than daily basis because of time constraints and since most households have refrigerators whose use slows the biological and chemical process of decay. Temperature control however is but one facet of maintaining vegetables fresh since one of the principal mechanisms of deterioration in taste of stored vegetables in refrigerated spaces is dehydration. Vegetables, like most plants, typically lose a great deal of moisture to the atmosphere by evaporation through the leaves or the body of its fruit. While vegetables are still attached to the plant in the ground, lost moisture is replaced by their root systems. Thus, once vegetables are harvested it is important to minimize moisture losses in addition to keeping them cool to maintain freshness.

Efforts have heretofore been made to alleviate this problem. These efforts have focused on minimizing the flow of cool air, which is relatively dry, into contact with the vegetables. Typical of such is the apparatus disclosed in U.S. Pat. No. 3,364,694 which is in the form of a vegetable container that has double walls. Refrigerated air is drawn through the space between the two walls and thus is not introduced into the container. This allows the vegetables to be chilled by thermal conduction rather than convection. Another type device, which is shown in U.S. Pat. No. 4,013,434, provides dampers to restrict the flow of dry refrigerated air into a vegetable container.

Another possible approach is taught in U.S. Pat. No. 2,560,057 wherein a self-contained refrigeration unit for the aging of beef has means for humidifying the air circulated over the meat to keep it from drying out. While this may be practical for commercial meat lockers, it is not practical for small scale consumer use since household refrigerators require dry air to prevent excessive frosting of the interior of the refrigerator and since they are designed to hold and cool many diverse types of products. This also apparently would not be feasible for temporary out-of-home consumer use as, for example, in maintaining vegetables fresh on trips, picnics and the like.

Accordingly, it is seen that a need remains for apparatus for maintaining vegetables fresh and crisp within the confines of a conventional household refrigerator or in a small cooler or the like for consumer use. It is to this end that the present invention is primarily directed.

SUMMARY OF THE INVENTION

In one form of the invention a vegetable crisper comprises a container sized to be removably placed in a refrigerator and adapted to contain a body of water in a lower portion thereof. Support means are mounted within the container for supporting vegetables above the container lower portion. Sprinkling means are mounted in the container above the support means for sprinkling vegetables supported upon the support means with water. An electrically powered pump is provided means for pumping water from the lower portion to the sprinkling means. Filtering means are also provided for filtering water within the container. With this type of crisper vegetables may be placed in the container for storage within a refrigerator, supported above a standing body of water and sprinkled with water that is recycled and filtered to remove impurities introduced by the interaction of the water and the vegetables.

In another form of the invention a vegetable crisper comprises a container sized to be placed upon the shelf of a refrigerator and adapted to contain a lower body of water in a lower portion thereof. Support means are mounted within the container for supporting vegetables above the container lower portion. Sprinkling means in the form of a flat, board-shaped water permeable sprinkler head are mounted in an upper portion of the container spaced below the top of the container to define an upper portion of the container that is adapted to contain an upper body of water.

In yet another form of the invention a vegetable crisper comprises a container sized to be removably placed upon the shelf of a refrigerator and adapted to contain a body of water. A filter and an electrical pump are mounted within the container for circulating and filtering water within the container. Support members extend between two side walls of the container. Baskets are removably supported upon the support members in which vegetables may be stowed submerged in water in the container and the water cleaned of impurities generated by the interaction of the vegetables and the water.

BRIEF DESCRIPTION OF THE DRAWINGS

FIG. 1 is a front perspective view of a vegetable crisper embodying principles of the invention in a preferred form with the crisper power cord shown extending through the door of a refrigerator.

FIG. 2 is an exploded view of the vegetable crisper of FIG. 1.

FIG. 3 is a side elevation view, shown partly in cross section, of the vegetable crisper of FIG. 1.

FIG. 4 is a perspective view, shown partially broken away to reveal internal components of another embodiment of the invention.

FIG. 5 is a perspective view, shown partially broken away and exploded to reveal internal components of yet another embodiment of the invention.

DETAILED DESCRIPTION

Referring now in more detail to the drawings, in FIGS. 1-3 there is shown a vegetable crisper that comprises a container, generally indicated at 10, which is generally box shaped and is sized to be set upon the shelf of a conventional refrigerator. The container 10 has a removable lid 11 and a bottom floor 12 from which four sides 13 upwardly extend. The lid is made of a light transparent plastic and has a sloped top to allow spilled liquids to run off. A corrugated shelf 14 is mounted upon the container floor 12 which has a number of perforations 15 therethrough. The shelf is formed with two upright partitions 16 that straddle a central opening. Two of the container sides are seen to be formed with exterior handles 20 and 21 for hand carrying.

A cylindrical housing or tower 17 is mounted centrally within the container upon the floor 12 so as to project upwardly therefrom through the central opening in the shelf 14 to a position just beneath the lid 11. An electrically operated water pump 18 is mounted in the bottom of the housing such that its water intake is located in fluid communication with an array of holes 23 in the bottom portion of housing. A filter 19 is mounted in the housing above the pump so that water exiting the pump passes upwardly through the filter and into a dome-like spray head 24 that is threaded onto the cylindrical housing. The spray head has an annular array of outlet ports or nozzles 22 which are shaped and oriented to spray water outwardly and downwardly from the head.

A first electrical power line extends from the electrical motor portion of the pump 18 out of the housing 17 beneath shelf 14 and then out of the container through a removable, double wall water seal 29 that is attached to a side of the container. The end of this line has a female connector 30 to which a male connector 31 of a second electrical line 27 is secured. Line 27 is connected with one end of a flat ribbon cable 32 the other end of which is connected to third power line 28 that has a plug 33 adapted to be plugged into a wall socket. The ribbon cable here is sufficiently thin and flexible to allow it to be draped flushly across a door seal S of a conventional refrigerator without impairing the function of the door seal and held in place by a tacky ribbon coating or the like. All of the power lines and couplers are conventionally formed of electrically insulated conductive wires.

Referring next to FIG. 4, there is shown another vegetable crisper which comprises a container indicated generally at 40 which is generally box shaped and sized to fit on the shelf of a conventional refrigerator. The container has a removable lid or cover 41 and a base 42. The base 42 has vertical dividers 43 for creating individual compartments within the base. It also has a horizontal shelf 44 that has holes 45 therein. The shelf is mounted in the container to define a container lower portion between it and the container floor.

An access door 47 is hingedly attached to lid 41 for access to an upper portion or space 46 in which a body of water may be contained. A sprinkler in the form of a flat, board-shaped water permeable sprinkler head is mounted in the container to define the bottom of the upper portion or space. Finally, the container is formed with a spout 49 that has its outlet located at an elevation just beneath the bottom surface of the sprinkler head.

Referring next to FIG. 5, there is shown yet another form of the vegetable crisper which comprises a container indicated generally at 50. The container has a removable top or lid 58, only a portion of which is shown for clarity of illustration, and a container base 52. The container is generally box shaped and sized to fit on a shelf of a conventional refrigerator. The container base 52 has three support rods 53 that are mounted horizontally in an upper portion of base 52. The support rods 53 are spaced apart a distance to support the lips of four wire mesh baskets 54.

An electric water pump and filter assembly 56 is mounted in a lower portion of container base 52. A timer and battery type power supply 57 is also mounted in a lower portion of container base 52 adjacent the pump and filter assembly 56.

OPERATION

Referring back now to the embodiment of FIGS. 1, 2 and 3, to begin operation the top 11 is removed and a quantity of water poured into the container sufficient to fill the lower portion of the container below the bottom of the shelf 14. Vegetables may then be placed upon the shelf and the lid 11 replaced. With the ribbon portion of the power cord secured in place to the door seal S of the refrigerator, and connectors 30 and 31 connected together, the plug on the end of line 28 may be inserted into a wall outlet. The water pump then pumps and draws water in through tower inlet ports 23, upwardly through filter element 19 and out of the sprinkler head. Water emerging from the outlet ports 22 is sprayed in all directions upon the vegetables, thereby wetting them. The water drips off of the vegetables onto the shelf 14 and then drains through the holes 15 and into the lower portion of the container. In this manner the vegetables are maintained cool and wet.

The partitions 16 and tower 17 serve to prevent some of the vegetables from contacting others. Alternately, a timer may be included to turn the pump on and off at selected intervals. The lid 11 is preferably made of a transparent plastic to allow inspection of the container and to let the users know when the pump is on and water is being sprayed. The filter element 19 may be replaced by unscrewing the threaded spray head 24 from the threaded cylindrical housing member 17 and removing the element.

With regard to the embodiment illustrated in FIG. 4, vegetables are placed upon the shelf 44 with the lid 41 removed. The door 47 is then opened and water poured into the sprinkler head as with a pitcher P until the top space is filled. Water in the cavity 46 then slowly drips through the porous or micromesh membrane type water permeable sprinkler 48 and slowly onto the vegetables. This dripping through the membrane 48 continues for some time. Water that has dripped onto the vegetables drains off of them, through the shelf and into the lower portion of the container. The lower space is sufficiently larger to accommodate all of the water supplied in the top space so that the vegetables do not stand in a standing body of water. Periodically the water may be drained by tilting the container so to lower the spout 49. If desired ice may be placed in the container top space. As the ice melts it turns to water which then passes through the sprinkler. This has two effects: firstly, it provides cooling for the unit to keep the vegetables cold; secondly it provides moisture for the vegetables to keep them from drying out. Thus, the crisper 40 here can be used either in a refrigerator or portably.

Referring finally to the embodiment illustrated in FIG. 5, a crisper base 50 is filled with water. Vegetables may then be immersed in water by placing them in the baskets 54 and supporting them on the supports 53. The pump 56, powered by the power supply and timer 57, periodically engages and draws in water from the container base 52, forces it through an internal filter and expels it once again into the container base 52. By doing so the pump and filter assembly work to remove impurities in the water introduced by the interaction of the vegetables with the water. Additionally, the water should be periodically replaced in total by the operator.

It thus is seen that a vegetable crisper is now provided for use in maintaining vegetables crisp and fresh. It should be understood that the embodiments particularly described are preferred. Many modifications, additions and deletions may be made thereto without departure from the spirit and scope of the invention as set forth in the following claims.

We claim:
1. A vegetable crisper comprising:
    a container sized to be removably placed in a refrigerator and adapted to contain a body of water in a lower portion thereof;

support means mounted within said container for supporting vegetables above said container lower portion;

sprinkling means mounted in said container above said support means for sprinkling vegetables supported upon said support means with water;

electrically powered pump means for pumping water from said lower portion to said sprinkling means;

and filtering means for filtering water within said container;

whereby vegetables may be placed in the container for storage within a refrigerator and supported above a standing body of water and sprinkled with water that is recycled and filtered to remove impurities introduced by the interaction of the water and the vegetables.

2. The vegetable crisper of claim 1 further including a tower mounted upon a bottom surface of said container and extending through an opening in said vegetable support means to an upper portion of said container, said tower being hollow and housing said pump means and said filter means.

3. The vegetable crisper of claim 2 wherein said tower has water inlet means formed in a lower portion thereof, and wherein said sprinkling means includes a spray head threadedly mounted to an upper portion of said tower.

4. The vegetable crisper of claim 3 wherein said tower is generally cylindrical, and wherein said spray head has an annular array of water outlets.

5. The vegetable crisper of claim 3 wherein said shelf is formed with a pair of walls that extend upwardly above said corrugations and which straddle said tower whereby the pair of walls and tower jointly provide a petition for separating vegetables supported upon said shelf.

6. The vegetable crisper of claim 1 further comprising an electrical power cord connected to said electrically powered pump means that includes a flat flexible ribbon portion sized to overlay a refrigerator door seal, and means for holding said ribbon portion of said power cord in place snugly to the door seal.

7. The vegetable crisper of claim 1 wherein said vegetable support means comprises a corrugated shelf having holes therethrough through which water upon the upper surface of the shelf may drain into said container lower portion.

8. A vegetable crisper comprising:

a container sized to be placed upon the shelf of a refrigerator and adapted to contain a lower body of water in a lower portion thereof;

support means mounted within said container for supporting vegetables above said container lower portion; and sprinkling means mounted in an upper portion of said container spaced below the top of said container to define an upper portion of said container adapted to contain an upper body of water, said sprinkling means comprising a flat board-shaped water permeable sprinkler head;

whereby vegetables may be placed in the tray and the container upper portion filled with cold water that may gravitate through the water permeable sprinkler head and onto the vegetables and collect in the container lower portion.

9. The vegetable crisper of claim 8 wherein said vegetable support means comprises a corrugated shelf having holes extending therethrough.

10. The vegetable crisper of claim 8 wherein said container has a drain spout having an outlet located just below the elevation of the bottom surface of said sprinkler means.

11. A vegetable crisper comprising a container sized to be removably placed upon the shelf of a refrigerator and adapted to contain a body of water; a filter; electrical pump means mounted within said container for circulating water within said container through said filter; a plurality of support members extending between two side walls of said container; and a plurality of baskets removably supported by said support members, whereby vegetables may be stowed and removably submerged in water in the container and the water cleaned of impurities generated by the interaction of the vegetables and water.

* * * * *